United States Patent
Nishiguchi (10) Patent No.: US 7,916,323 B2
(45) Date of Patent: Mar. 29, 2011

(54) PRINTER, METHOD FOR CONTROLLING THE PRINTER AND COMPUTER READABLE MEDIUM

(75) Inventor: Tomohiro Nishiguchi, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1003 days.

(21) Appl. No.: 10/752,557

(22) Filed: Jan. 8, 2004

(65) Prior Publication Data
US 2005/0068566 A1 Mar. 31, 2005

(30) Foreign Application Priority Data
Sep. 30, 2003 (JP) ................................. 2003-341140

(51) Int. Cl.
*G06F 3/12* (2006.01)
(52) U.S. Cl. ....... 358/1.15; 358/1.1; 358/1.14; 709/201; 709/202; 709/203
(58) Field of Classification Search ................. 358/1.14, 358/1.15, 1.9, 1.16; 707/3, 10; 709/202, 709/203, 212, 216, 217, 218, 219, 224
See application file for complete search history.

(56) References Cited

U.S. PATENT DOCUMENTS

| | | | | |
|---|---|---|---|---|
| 5,129,639 A * | 7/1992 | DeHority | ...................... | 270/1.01 |
| 5,220,674 A * | 6/1993 | Morgan et al. | ................. | 709/223 |
| 5,228,118 A * | 7/1993 | Sasaki | ........................... | 358/1.13 |
| 5,467,434 A * | 11/1995 | Hower et al. | ................. | 358/1.15 |
| 5,625,757 A * | 4/1997 | Kageyama et al. | .......... | 358/1.14 |
| 5,768,516 A * | 6/1998 | Sugishima | ..................... | 709/217 |
| 5,854,693 A * | 12/1998 | Yoshiura et al. | .............. | 358/468 |
| 5,995,722 A * | 11/1999 | Kishida | ......................... | 358/1.15 |
| 6,188,487 B1 * | 2/2001 | Matsubara | .................... | 358/1.15 |
| 6,299,364 B1 | 10/2001 | Maruta et al. | | |
| 6,362,894 B1 * | 3/2002 | Shima | .......................... | 358/1.15 |
| 6,369,909 B1 * | 4/2002 | Shima | .......................... | 358/1.15 |
| 6,476,927 B1 * | 11/2002 | Schwarz, Jr. | ................. | 358/1.15 |

(Continued)

FOREIGN PATENT DOCUMENTS

JP 7-281979 10/1995

(Continued)

OTHER PUBLICATIONS

Japanese Office Action mailed Oct. 25, 2005, directed to JP Application No. 2003-341140.

*Primary Examiner* — King Y Poon
*Assistant Examiner* — Richard Zhu
(74) *Attorney, Agent, or Firm* — Morrison & Foerster LLP (57) ABSTRACT

A printer is provided that can be used easily and preferably without introducing an additional structure into a terminal device and a server. The printer includes a printing process portion for printing based on print data, a print data detection portion for detecting print data stored in a file server, a data reception portion for obtaining print data and the corresponding printing conditions information from the file server when the print data are detected, a print approval/disapproval judge portion for judging approval/disapproval of printing based on the obtained printing conditions information and a print control portion for controlling the printing process portion so that printing is performed based on print data corresponding to the printing conditions information when it is determined to be printable, and for controlling the same so that printing is not performed when it is determined to be unprintable.

13 Claims, 7 Drawing Sheets

U.S. PATENT DOCUMENTS

| | | | |
|---|---|---|---|
| 6,502,147 B2 * | 12/2002 | Reilly | 710/104 |
| 6,529,286 B1 * | 3/2003 | King | 358/1.14 |
| 6,552,813 B2 * | 4/2003 | Yacoub | 358/1.1 |
| 6,700,678 B1 * | 3/2004 | Luman | 358/1.15 |
| 6,804,022 B2 * | 10/2004 | Fujiwara et al. | 358/1.15 |
| 6,859,832 B1 * | 2/2005 | Gecht et al. | 709/224 |
| 7,102,778 B2 * | 9/2006 | Parry | 358/1.15 |
| 7,110,131 B2 * | 9/2006 | Nakata et al. | 358/1.15 |
| 7,180,619 B2 * | 2/2007 | Ferlitsch | 358/1.15 |
| 7,227,659 B2 * | 6/2007 | Nakata et al. | 358/1.15 |
| 7,283,272 B2 * | 10/2007 | Johnson et al. | 358/1.15 |
| 7,312,886 B2 * | 12/2007 | Gomi | 358/1.15 |

FOREIGN PATENT DOCUMENTS

| | | |
|---|---|---|
| JP | 9-319531 | 12/1997 |
| JP | 11-95961 | 4/1999 |
| JP | 2000-112687 | 4/2000 |
| JP | 2002-196910 | 7/2002 |
| JP | 2002-297330 | 10/2002 |
| JP | 2002-337425 | 11/2002 |
| JP | 2002-373061 | 12/2002 |

* cited by examiner

| | ESSENTIAL PRINTING ATTRIBUTE ITEM (ESSENTIALS) | CONSISTENT NUMBER IN ITEMS OTHER THAN ESSENTIALS |
|---|---|---|
| DESIGNATION EXAMPLE 1 | ALL | 0 |
| DESIGNATION EXAMPLE 2 | PRINTER LANGUAGE, MAXIMUM PRINTING COST | 3 |
| DESIGNATION EXAMPLE 3 | PRINTER LANGUAGE, DESIRED PRINT SPEED | 0 |
| ... | ... | ... |

FIG.7

PRINTER, METHOD FOR CONTROLLING THE PRINTER AND COMPUTER READABLE MEDIUM

This application is based on Japanese Patent Application No. 2003-341140 filed on Sep. 30, 2003, the contents of which are hereby incorporated by reference.

BACKGROUND OF THE INVENTION

1. Field of the Invention

The present invention relates to a printer and others that are shared on a network.

2. Description of the Related Art

Conventionally, there is proposed a printing system in which plural printers (image forming devices) are shared by plural terminal devices.

For example, a system described in Japanese unexamined patent publication No. 2002-373061 is structured by a user PC, a data storage server and printers. A user transmits document data of a document to be printed from the user PC to the data storage server together with printing attribute data. The data storage server analyzes the printing attribute data to transmit the document data to a printer where printing is to be performed. Then, the printer performs a printing process. Additionally, when a printer makes a request, the data storage server analyzes printing attribute data that is saved therein to send document data to the printer.

A system described in Japanese unexamined patent publication No. 2002-337425 is configured by a client, a printed matter output management server and output devices. In the printed matter output management server is registered attribute information relating to each of the output devices in advance. Based on the attribute information of each of the output devices and print desire information sent from the client together with print data, the printed matter output management server determines an output device where the print data are to be output (printed) and sends the print data to the output device. Likewise, according to a system described in Japanese unexamined patent publication No. 7-281979, a server determines a device at a print destination.

A system described in Japanese unexamined patent publication No. 2000-112687 is configured by a host device, a WWW server and a printer. A user operates his/her host device to give a pull print instruction to the printer as a destination printer. After receiving the pull print instruction, the printer obtains print data according to print quality thereof from the WWW server to perform a printing process.

A system described in Japanese unexamined patent publication No. 2002-297330 is structured by a client terminal, a server and a printer. A user operates the client terminal to request the printer to perform printing. Responding to the request, the printer obtains print data from the client terminal to perform a printing process. Further, a user can require printing to the server. In this case, the server manages execution sequence of printing and issues a print instruction to the printer in accordance with the execution sequence. Then, the printer obtains print data from the client terminal to perform a printing process.

Printers provided in a printing system have individual characteristics. Such printers have characteristics relating to specifications (function), a cost, an installation site or others, more particularly, color printing is available, duplex printing is available, thumbnail printing (N-up printing) is available, print speed is fast but cost performance is low, print speed is slow but cost performance is high, an installation site is close to a user's position or an installation site is away from a user's position.

The greater the number of printers in a printing system is, the harder a user recognizes which printer is capable of printing in line with the user's demand. Even if the user recognizes such a proper printer, when the printer is in the process of large amount of print jobs or the printer has some kind of failure, the user needs to find another printer. Further, when a user who usually requires only monochrome printing needs color printing, the user probably needs to find another printer other than a printer that the user normally uses. Even if a printer is introduced into a printing system anew, it is troublesome to check that either the new printer or a printer that has been used so far is more suitable for a user. For that reason, there is a case where the newly introduced printer is not used effectively. On the contrary, even though the existing printer is more suitable than the new printer for certain users, there is a case where the new printer is used quite often and the existing printer is not used effectively.

Further, every time when a destination printer is changed from a printer to another printer, setting change in a terminal device of a user is required. Such a setting operation is troublesome for a user.

In this connection, a method is conceivable in which attribute information of all printers is registered in a server and a print job is assigned to a printer by the server.

However, if the number of printers is large, the server shoulders the burden of judge processing for sorting print jobs and other processing, so that processing delay may happen in the entire printing system. Additionally, the server setting needs changing every time when printer(s) in the printing system has some changes, which is bothersome for an administrator.

In all the conventional printing systems discussed above, a setting operation is required for either a terminal device of a user or a server in the case of changing or adding printer(s).

SUMMARY OF THE INVENTION

The present invention is directed to solve the problems pointed out above, and therefore, an object of the present invention is to provide a printer that can be used easily and preferably without introducing an additional structure into a user's terminal device and a server.

A printer according to one aspect of the present invention is connected to a server via a network. The printer includes a print portion for printing based on print data, a detection portion for detecting print data stored in the server, a print data obtaining portion for obtaining print data and printing conditions information corresponding to the print data from the server when the print data are detected, the printing conditions information indicating conditions relating to printing, a print approval/disapproval judge portion for judging whether or not printing can be performed based on the obtained printing conditions information, and a print control portion for controlling the print portion so that printing is performed based on print data corresponding to the printing conditions information when the print approval/disapproval judge portion determines that printing can be performed based on the printing conditions information, and for controlling the print portion so that printing based on print data is not performed when the print approval/disapproval judge portion determines that printing can not be performed.

Further, a printer according to another aspect of the present invention includes a suitability judge portion for judging suitability of printing based on print data obtained by the print data obtaining portion, based on the printing conditions information corresponding to the print data, a transmission portion for associating information relating to the suitability with the printing conditions information to transmit the information relating to the suitability to the server when the suitability meets standards, a print approval/disapproval judge portion for judging that printing can be performed based on print data when the suitability of the printer is higher than that of other printers associated with the printing conditions information, and for judging that printing can not be performed based on print data when the suitability of the printer is lower than that of the other printers, the suitability being associated with the printing conditions information corresponding to the print data that are stored in the server after predetermined time elapses from transmission of the information relating to the suitability by the transmission portion and are obtained by the print data obtaining portion, and a print control portion for controlling the print portion so that printing is performed based on print data when the print approval/disapproval judge portion determines that printing can be performed based on the print data, and for controlling the print portion so that printing based on the print data is not performed when the print approval/disapproval judge portion determines that printing can not be performed.

In a preferred structure, the print data obtaining portion obtains print data detected by the detection portion after the print approval/disapproval judge portion determines that printing can be performed based on the printing conditions information corresponding to the print data.

According to the present invention, in a printing system, it is possible to easily add a printer without introducing a special structure into a terminal device and a server and to use the printer suitably.

These and other characteristics and objects of the present invention will become more apparent by the following descriptions of preferred embodiments with reference to drawings.

DESCRIPTION OF THE PREFERRED EMBODIMENTS

Figure 1:
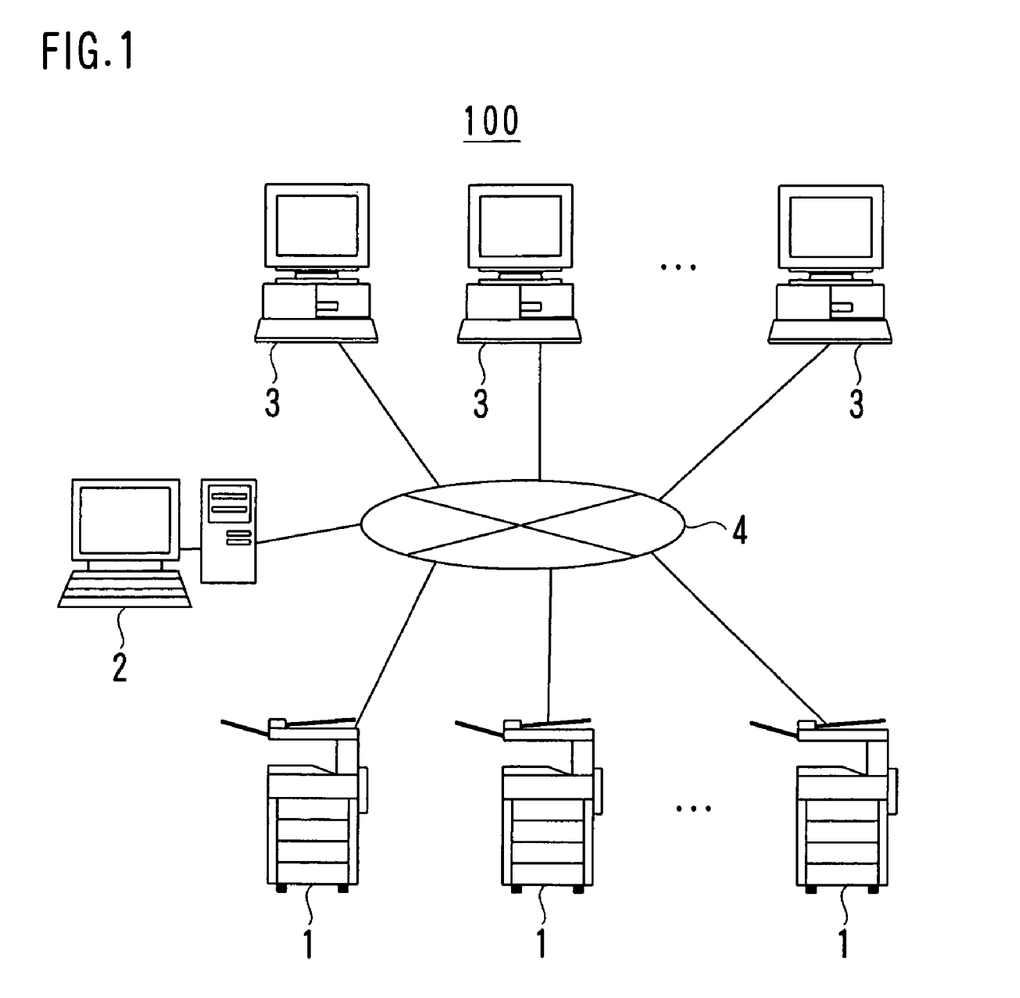
FIG. 1 is a diagram showing an example of the entire structure of a printing system.
Figure 2:
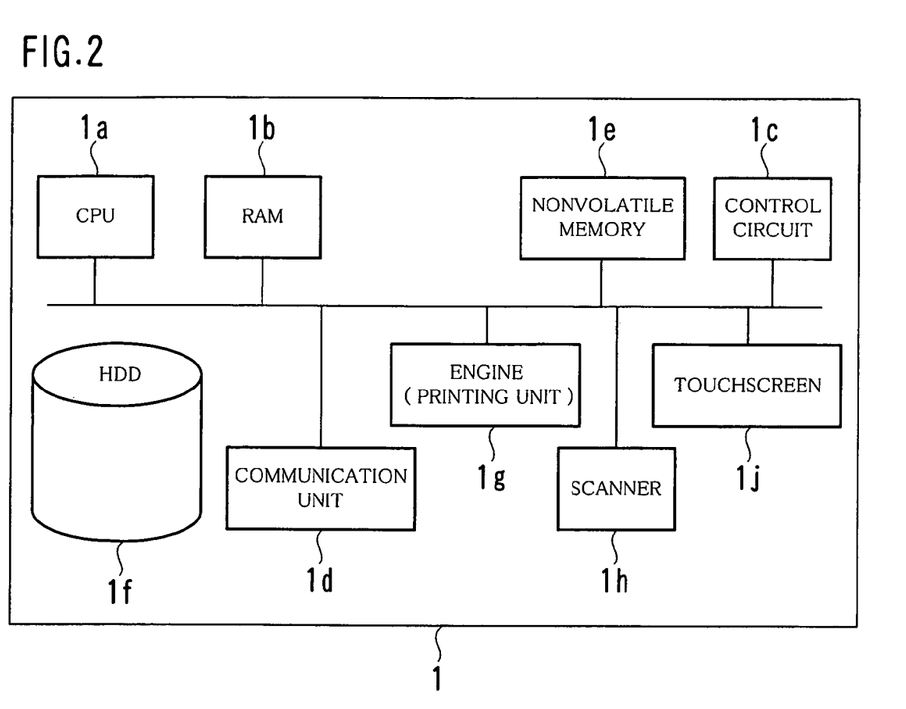
FIG. 2 is a diagram showing an example of a hardware structure of a printer.
Figure 3:
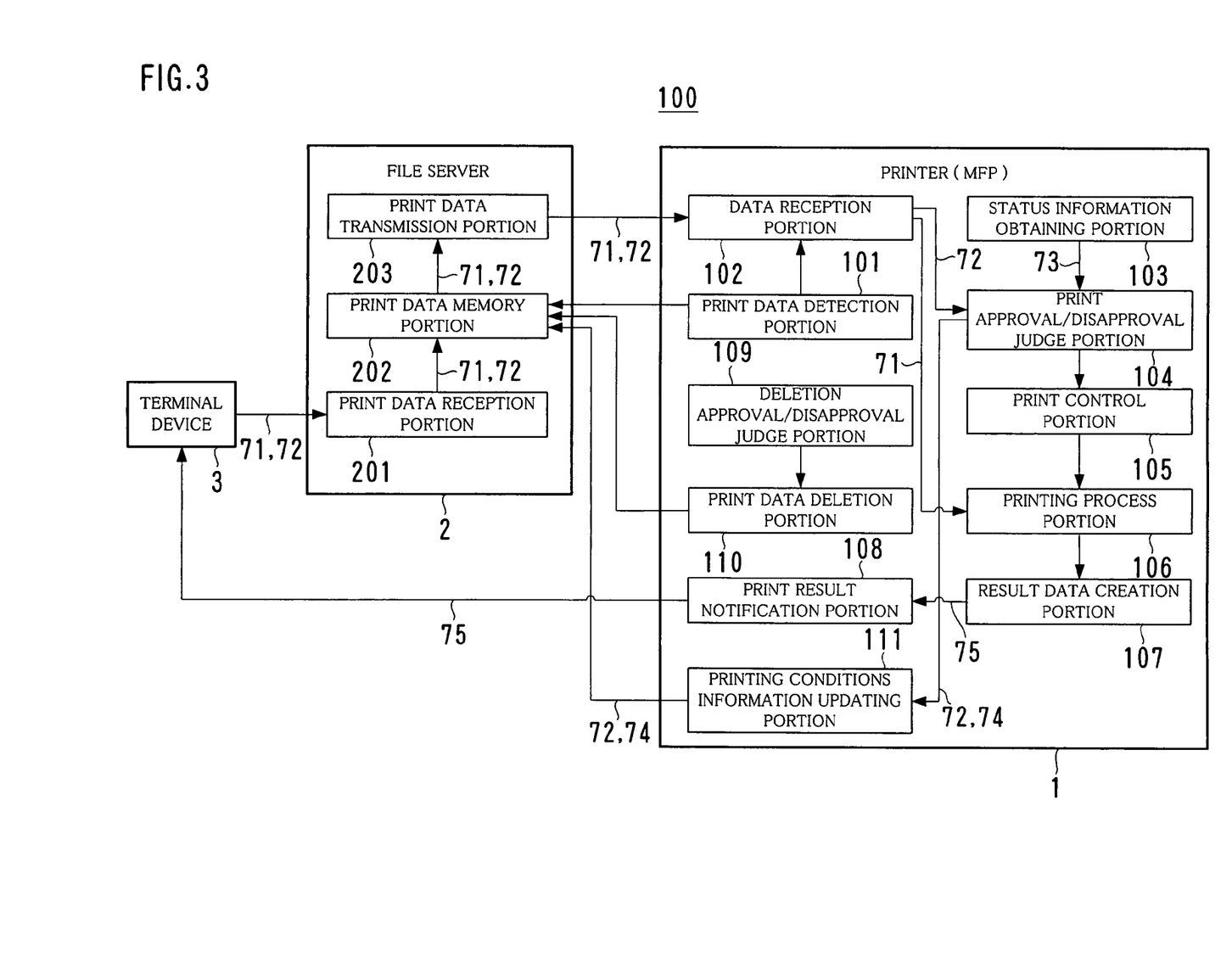
FIG. 3 is a block diagram illustrating an example of functional structures of the printer and a file server.
Figure 4:
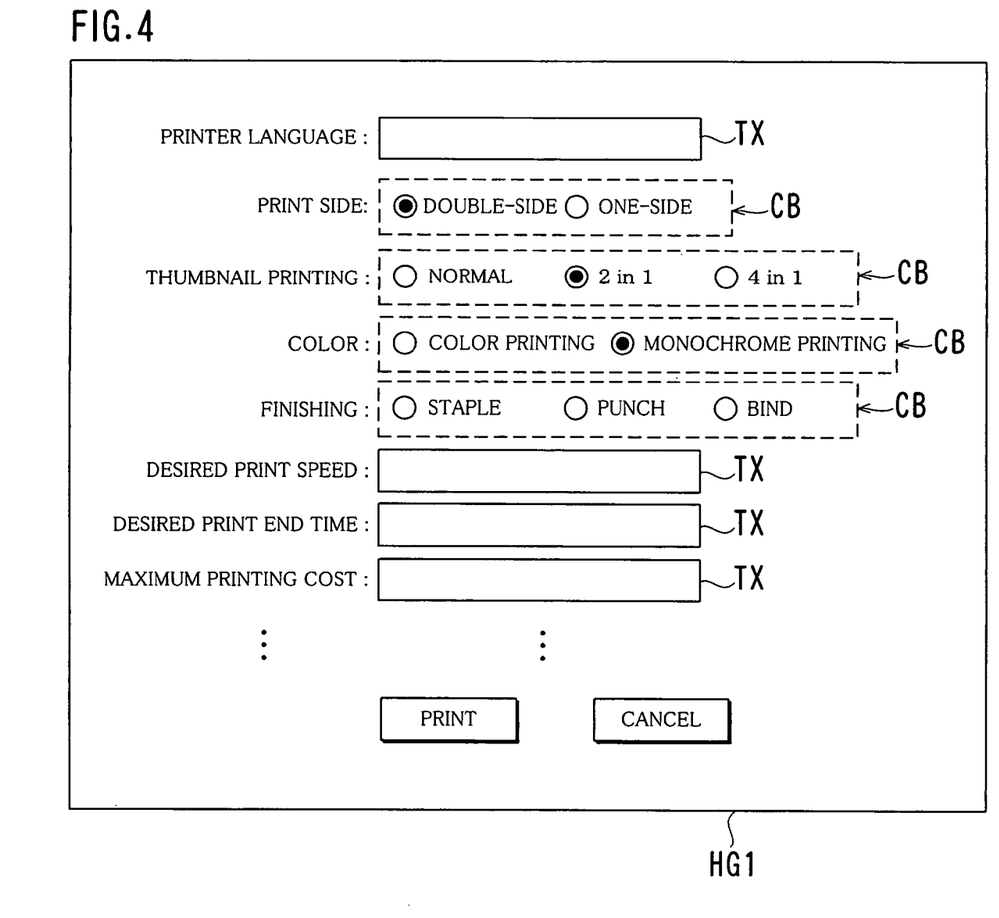
FIG. 4 shows an example of a printing conditions designation screen.
Figure 5:
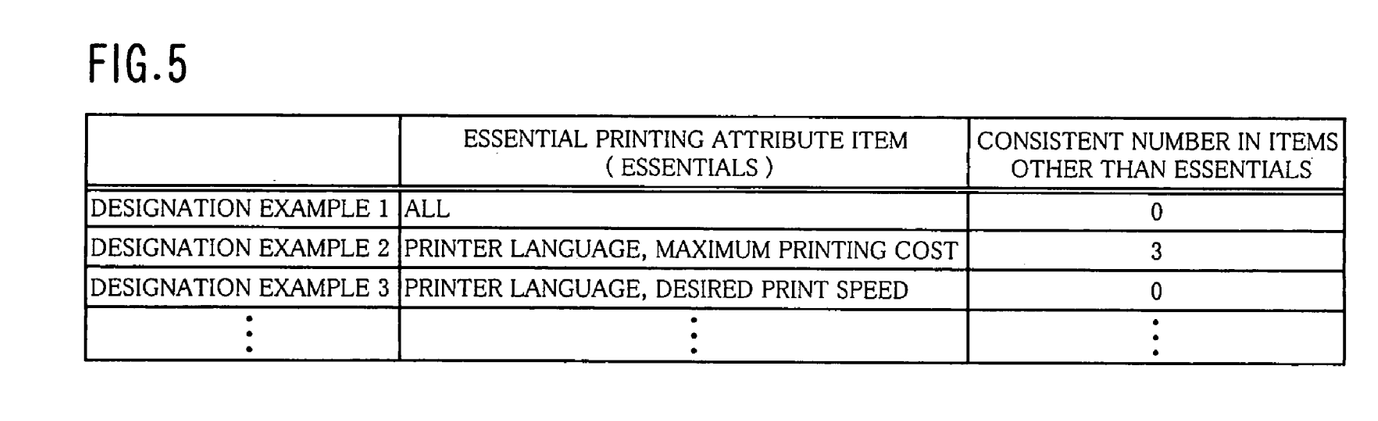
FIG. 5 shows an example of designation of printable conditions.
Figure 6:
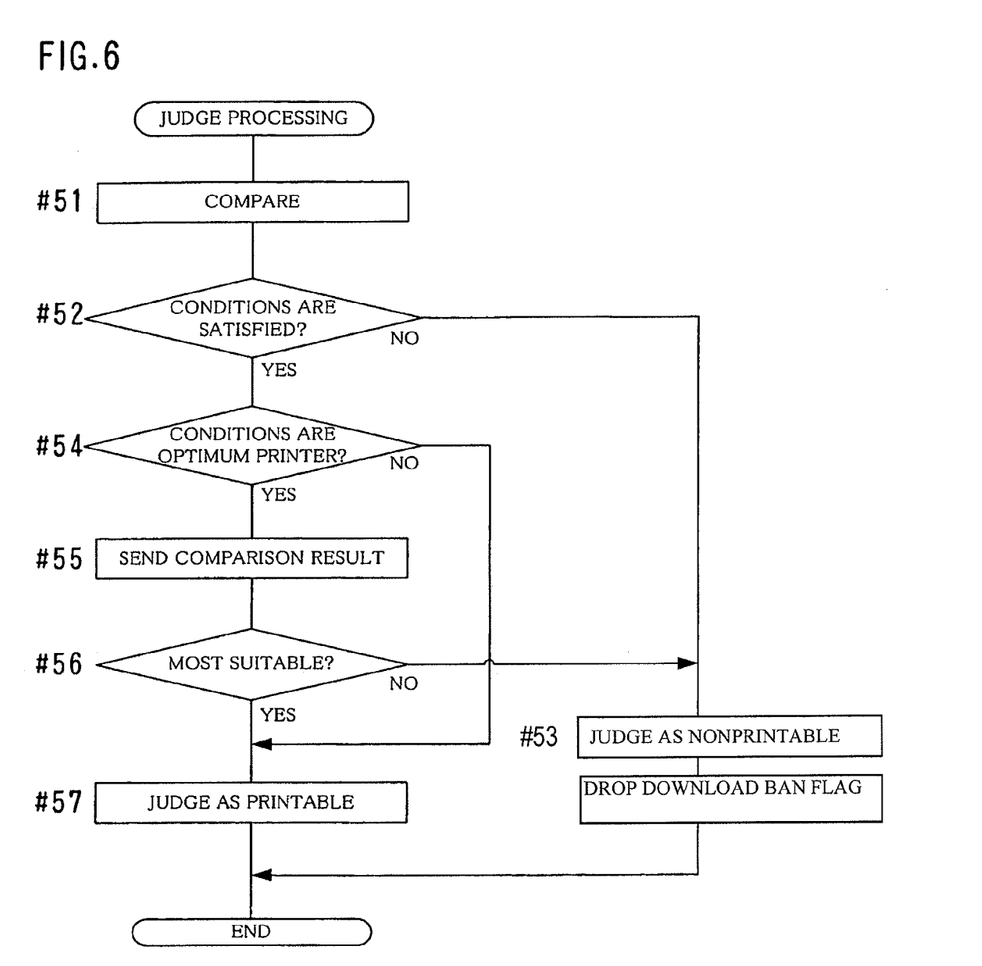
FIG. 6 is a flowchart showing an example of judge processing.

FIG. 1 is a diagram showing an example of the entire structure of a printing system 100. FIG. 2 is a diagram showing an example of a hardware structure of a printer 1. FIG. 3 is a block diagram illustrating an example of functional structures of the printer 1 and a file server 2. FIG. 4 shows an example of a printing conditions designation screen HG1. FIG. 5 shows an example of designation of printable conditions. FIG. 6 is a flowchart showing an example of judge processing.

As shown in FIG. 1, the printing system 100 includes the printers 1 according to the present invention, the file server 2, terminal devices 3 and a communication line 4. The printers 1, the file sever 2 and the terminal devices 3 can be connected to one another via the communication line 4. The Internet, an intranet, a public line, a dedicated line or the like is used as the communication line 4. Communication protocol can be TCP/IP, Hypertext Transfer Protocol (HTTP), File Transfer Protocol (FTP), Simple Network Management Protocol (SNMP) or others.

As each of the printers 1, a printer (an image forming device) for a personal computer, which can be shared by plural users and is generally termed "a network printer", or others is used. Alternatively, each of the printers 1 can be a multifunction device (sometimes called a Multifunction Peripheral (MFP)) where functions of a copier, a printer, a scanner, a fax machine, a document server or others are consolidated. A network printer and an MFP can coexist in the printing system 100. Hereinafter, an explanation is made to a case where each of the printers 1 is an MFP.

Referring to FIG. 2, the printer 1 includes a CPU $1a$, a RAM $1b$, a control circuit $1c$, a communication unit $1d$, a nonvolatile memory $1e$, a magnetic storage device (a hard disk drive) $1f$, a printing unit $1g$, a scanner $1h$ and a touchscreen $1j$.

The control circuit $1c$ serves to control all parts structuring the printer 1. The communication unit $1d$ serves to exchange data with the file server 2, the terminal devices 3 or others.

On the magnetic storage device $1f$ are installed programs and data for realizing functions of various portions including a print data detection portion 101, a data reception portion 102, a status information obtaining portion 103, a print approval/disapproval judge portion 104, a print control portion 105, a printing process portion 106, a result data creation portion 107, a print result notification portion 108, a deletion approval/disapproval judge portion 109, a print data deletion portion 110 and a printing conditions information updating portion 111, all of which are shown in FIG. 3. These programs and data are loaded on the RAM $1b$ as required and the programs are executed by the CPU $1a$.

As the nonvolatile memory $1e$, a ROM, a rewritable EEPROM or a flash memory is used. It is possible to make the nonvolatile memory $1e$ memorize the whole or a part of programs or data memorized in the magnetic storage device $1f$. Alternatively, a processor (the control circuit $1c$) may be used to realize the whole or a part of functions shown in FIG. 3.

Each of the terminal devices 3 can be a personal computer, a workstation, a personal digital assistant (PDA), a cellular phone or others. The terminal device 3 has a function for transferring (uploading) a file to the file server 2 and a function for receiving e-mail. A user of the terminal device 3 can make one of the printers 1 perform a print job of his/her desired document or others.

As the file server 2, what is commonly called a UNIX (registered trademark) server, a PC server or the like is used. On a magnetic storage device of the file server 2 are installed programs and data for realizing functions of portions including a print data reception portion 201, a print data memory portion 202 and a print data transmission portion 203, all of which are illustrated in FIG. 3.

Hereinafter, an explanation is given of processing contents or others of the terminal device 3 and all portions in each of the printer 1 and the file server 2, which are shown in FIG. 3.

Referring to FIG. 3, a user can operate his/her terminal device 3 to print a material prepared using application software such as word-processing software, spreadsheet software or computer graphics software, a material obtained from an external server or others thorough the Internet or the like, or other materials by means of any one of the printers 1.

When the user enters a predetermined command during running application software, the printing conditions designation screen HG1 is displayed on the terminal device 3 as shown in FIG. 4. Then, the user types text in each text box TX or selects an option button in each option group CB. Thus, the user designates printing conditions including "printer language", "print side", "thumbnail printing", "color", "finishing", "desired print speed", "desired print end time", "maximum printing cost", "the number of output sheets of print data", "output location of print data", "organization to which output printer belongs", "information of person outputting print data", "start time of print job", "print data deletion conditions", "print data deletion time", "printable conditions" and "priority conditions".

In the "printer language", a printer language used for describing print data for printing a document (material) and a version of the printer language are designated. For example, PostScript of Adobe Systems Inc., PCL of Hewlett-Packard Development Company, L.P., or the like is designated along with the respective versions. In the "print side", it is designated that a material is printed on both sides of a piece of paper or on one side thereof. In the "thumbnail printing", the number of materials to be printed on a single sheet of paper is specified. In the "color", it is designated that color printing is performed or monochrome printing is performed. In the "finishing", a way for completing a printed material is specified. For example, any one of staple, punch, bind and the like is designated.

In the "desired print speed" and "desired print end time", preferred speed of printing, and date and time when a printing process is completed are designated respectively. In the "maximum printing cost" is specified an allowable amount of a printing cost at the time of performing this printing process. In "the number of output sheets of print data", the number of printed copies is designated.

In the "output location of print data" and the "organization to which output printer belongs" are designated a place where a printed material is intended to be output (a main office such as "Tokyo central office" and a branch office, for example) and an organization to which an output printer belongs (a division such as a "marketing department", for example), respectively. In the "information of person outputting print data", information relating to a user sending print data is specified. For example, a user name, an e-mail address, an affiliation the user belongs to, a print quantity up to the present and an upper limit of a print quantity are designated in the form of "(AAABBB), (AAA@aaa.com), (marketing department), (52), (300)". In the "start time of print job", desired date and time when a printing process is started are specified.

Hereinafter, items indicating all conditions from the "printer language" through the "start time of print job" are sometimes referred to as "printing attribute item(s)".

At the "print data deletion conditions" are designated conditions for clearing print data stored in the file server 2, in other words, cases where print data are deleted. Designated as such conditions are, for example, a case where printing was completed normally based on print data 71, a case where there are print data 71 that are not used for printing for a long time (for example, even after predetermined time elapsed after detecting the print data 71 for the first time) and remain saved, a case where time indicated in the "print data deletion time" elapsed or other cases.

At the "printable conditions" are specified conditions for implementing a printing process in a printer 1. For instance, as shown in designation examples 1-3 of FIG. 5, the item name(s) or the number of conditions when implementation of a printing process is allowed is specified, the conditions being indicated in the printing attribute items mentioned above.

The designation example 1 shows that a printing process may be performed in a printer 1 when the printer 1 satisfies conditions of all the printing attribute items. The designation example 2 illustrates that a printing process may be performed when two conditions of the "printer language" and the "maximum printing cost" out of the printing attribute items are satisfied without any exception, and when three or more conditions out of the printing attribute items other than the above-mentioned two items are satisfied. The designation example 3 shows that a printing process may be performed as long as two conditions of the "printer language" and the "desired print speed" out of the printing attribute items are fulfilled.

In the "priority conditions", a printer that is to perform a printing process is specified when plural printers 1 meet printable conditions. As the priority conditions, for example, "the earliest printer", an "optimum printer" or the like is specified. An explanation will be made to the priority conditions later.

A user does not necessarily designate all of these conditions. It is sufficient that a user designates only his/her desired conditions. Regarding conditions not designated by a user, default setting (a specified value) is used as required. For example, when a user does not designate conditions in the "color", it is so set that "monochrome printing" is automatically designated. With respect to conditions relating to a set value (printing attribute) that is not required at the time of performing a printing process, such as the "desired print speed", nothing is put in text boxes or options, i.e., no designation is made.

When a user presses a "print" button in the printing conditions designation screen HG1, the terminal device 3 generates printing conditions information 72 based on contents designated in text boxes TX and others, and further generates print data 71 for printing a material. Since the printing conditions information 72 is used as a setting value in the case of printing, it can be said that the printing conditions information 72 is attribute information of the printing. The print data 71 are described using a language designated at the "printer language" in the printing conditions designation screen HG1. The printing conditions information 72 is described using an Extensible Markup Language (XML). Alternatively, the printing conditions information 72 may be in the form of text data or binary data. The generated print data 71 and printing conditions information 72 are associated with each other to be transmitted to the file server 2.

Referring to FIG. 3, the print data reception portion 201 in the file server 2 makes the print data memory portion 202 memorize (store) the print data 71 and the printing conditions information 72 that are sent from the printer 1. The print data memory portion 202 memorizes the print data 71 and the printing conditions information 72 as one file. Alternatively, the print data memory portion 202 may memorize the same as two separate files or other data unit.

The print data detection portion 101 in the printer 1 accesses the file server 2 periodically to check whether or not the print data memory portion 202 stores print data 71. In addition, the print data detection portion 101 conducts the check at the time when a power switch is turned ON, when the printer 1 is reset, when the printer 1 is in a print-ready state (in an idle state) after completing a print job, when a user operates the touchscreen 1*j* (see FIG. 2) in the printer 1 to issue a search command, or other timing.

When print data 71 are detected, the data reception portion 102 requests the file server 2 to transmit this print data 71 and printing conditions information 72 corresponding thereto. Then, the print data transmission portion 203 in the file server 2 extracts the print data 71 and the printing conditions information 72 from the print data memory portion 202 to send the same to the printer 1. In this way, the print data 71 and the printing conditions information 72 are downloaded into the printer 1. Subsequently, the print data memory portion 202 in the file server 2 sets a flag indicating that download is prohibited (hereinafter referred to as a "download ban flag") for the print data 71, leading to prevent the print data 71 from being obtained by plural printers 1 around the same time.

The status information obtaining portion 103 in the printer 1 obtains status information 73 of the printer 1 itself. The status information 73 is obtained by reading setting values or specification information memorized in the RAM 1*b*, the nonvolatile memory 1*e* or others, or by inquiring of the printing unit 1*g* or the like as to the current state, or others. Similarly to the printing conditions information 72, the status information 73 is described using an XML or others. Alternatively, the status information 73 may be in the form of text data or binary data.

In the status information 73 are indicated items relating to various states and specifications (capabilities) of the printer 1. The items include, for example, "process state", "support language", "process function", "print speed", "printing cost calculation method", "installation site", "installation division", "count management information", "access privileges" and "printable conditions".

At the "process state" is indicated the current process state of a printer 1. For example, it is specified that the printer 1 is in a print-ready state (in an idle state), the printer 1 is performing a printing process based on another print job, or an error such as paper jam, paper-out or out of toner occurs in the printer 1 or others. In the "support language", a printer language supported by the printer 1 and a version of the printer language are indicated. In the "process function", functions of the printer 1 are specified. For example, it is indicated whether or not the printer 1 can perform duplex printing, thumbnail printing (N-up printing such as 2-in-1 printing or 4-in-1 printing), a staple process, a punch process or a bind process.

In the "printing cost calculation method" is specified a method for calculating a cost in the case of printing based on print data 71 obtained from the file server 2. For example, a function for cost calculation where a cost per paper is a coefficient is prepared for each case of color printing and monochrome printing. In the "installation site", a place where a printer 1 is located (a name of a main office, a branch office or others) is specified. In the "installation division", an organization to which a printer 1 belongs (a division name or the like) is indicated.

At the "count management information" is specified usage of a printer 1 for each user or each department, for example, a count value of printed papers. In the "access privileges", access privileges for each user or each department are shown. For example, authority of the use for each user or each department regarding each function such as color printing or duplex printing is specified.

At the "printable conditions" are specified conditions for implementing a printing process. For instance, as shown in FIG. 5 that is already described, the item name(s) or the number of conditions when implementation of a printing process is allowed is specified, the conditions being indicated in printing conditions information 72 obtained along with print data 71.

The print approval/disapproval judge portion 104 judges whether or not to perform a printing process based on print data 71 obtained from the file server 2, in accordance with printing conditions information 72 corresponding to the print data 71 and status information 73 of a printer 1 that attempts to perform a printing process, as in the procedure shown as in a flowchart of FIG. 6.

Referring to FIG. 6, first, the status information 73 of the printer 1 is compared to the obtained printing conditions information 72 (#51). More particularly, the status information 73 and the printing conditions information 72 are compared to each other in essential printing attribute items (see FIG. 5) designated by printable conditions included in the printing conditions information 72 or others. For instance, when designation such as the designation example 2 in FIG. 5 is made in the printable conditions, the "printer language" and the "maximum printing cost", which are essentials to each of the status information 73 and the printing conditions information 72, are compared between the status information 73 and the printing conditions information 72 and, further items (printing attribute items) other than the two items mentioned above are compared therebetween.

After the comparison, when all the essential items out of all the items in the status information 73 meet the conditions indicated in the printing conditions information 72, and when conditions are satisfied with respect to the indicated number or more of the items, out of the items except the essential items (three or more in the case of the designation example 2, for instance) (Yes in #52), it is determined that the printer 1 has a printing capability based on the obtained print data 71 and processing after step #54 continues.

Otherwise (No in #52), it is determined that the printer 1 does not have such a capability and that a printing process cannot be performed (#53). Then, a download ban flag of the print data 71 saved on the file server 2 is put down, which enables another printer 1 to obtain the same print data 71 for performing a printing process. Further, a note indicating that the printer determined to be incapable of printing cannot perform printing is written into attribute information of the print data 71.

It can be said that the comparison result in step #51 shows the degree of adequacy that a printer 1 performs printing based on print data 71, i.e., suitability of printing.

Before or after the comparison processing in step #51 or in parallel with the comparison processing, it is judged whether or not authority of use of the printer 1 is given to a user issuing a print instruction based on the "access privileges" in the status information 73. Then, when it is determined that the authority of use is not given, irrespective of the result in step #51 mentioned above, it is determined that printing cannot be performed (No in #52). In addition, it is checked whether or not the sum of a print quantity up to the present and print quantity in this time together exceeds an upper limit of a print quantity for the user. When exceeding the upper limit of the print quantity, irrespective of the result in step #51 mentioned above, it is determined that printing cannot be performed (No in #52).

There is a case where no printable conditions are specified in the printing conditions information 72. In such a case, comparison is made based on printable conditions included in the status information 73 in step #51. Alternatively, comparison may be made based on printable conditions included in both the printing conditions information 72 and the status information 73.

When the "optimum printer" is designated in the "priority conditions" in the printing conditions information 72 (Yes in #54), the printing conditions information updating portion 111 writes comparison result information 74 indicative of comparison result in step #51 into the printing conditions information 72, then to send the printing conditions information 72 to the file server 2 (#55). Thereby, printers having a possibility of implementing a printing process based on print data 71 are provided as candidates. On this occasion, the file server 2 updates the printing conditions information 72 that is memorized in the print data memory portion 202 at the present to replace the same with the received printing conditions information 72. Additionally, the download ban flag of the print data 71 is put down for the purpose of enabling other printers 1 to be provided as candidates of printers having a possibility of implementing the printing process.

Such processing is performed also in other printers 1. After that, the printers 1 write the respective comparison result information 74 into the printing conditions information 72 in the file server 2.

Then, after predetermined time (for example, time indicated in the "start time of print job" in the printing conditions information 72) elapses, the print approval/disapproval judge portion 104 accesses the file server 2. Comparison is made between the comparison result information 74 of the printer 1 itself and the comparison result information 74 of other printers 1, the comparison result information 74 being accumulated as attribute information of the print data 71. Thereby, it is judged whether the former printer 1 itself is the most suitable printer for printing based on the print data 71 (#56). For instance, when in the printing attribute items, the printer 1 has the largest number of conditions consistent with designated printable conditions, the printer 1 is determined to be the most suitable printer.

When the printer 1 itself is the most appropriate (Yes in #56), it is judged that the printer 1 can perform printing based on the print data 71 (#57). When another printer 1 is the most appropriate (No in #56), it is judged that the former printer 1 cannot perform printing based on the print data 71 (#53).

In the meantime, when the "earliest printer" is designated in the "priority conditions" in the printing conditions information 72 (No in #54), of printers 1 having a capability of performing printing based on print data 71, a printer 1 that obtains the print data 71 first can perform a printing process. Accordingly, if the printer 1 meets certain standards (Yes in #52), it is determined that the printer 1 can perform printing based on the print data 71 without comparison to other printers 1 (#57).

Referring to FIG. 3, when the print approval/disapproval judge portion 104 judges that printing can be performed based on print data 71 obtained from the file server 2 (see #57 in FIG. 6), the print control portion 105 generates a print job and gives a print instruction to the printing process portion 106. Responding to the instruction, the printing process portion 106 forms an image of a document based on the print data 71 to print the image on a sheet of paper.

The result data creation portion 107 creates print result data 75 indicating information such as a message of print completion, a device name and an installation site of a printer 1, detailed contents of printing (color printing or monochrome printing, one-side printing or duplex printing, a print quantity or the number of sets) or calculation of the number of papers printed by a user. The print result notification portion 108 uses e-mail to transmit the print result data 75 to an e-mail address shown in the printing conditions information 72. In this way, result is notified to a terminal device 3 of a user or a place designated by a user. The print result data 75 may be sent to the file server 2.

The deletion approval/disapproval judge portion 109 judges whether or not print data 71 saved on the file server 2 and printing conditions information 72 corresponding thereto can be deleted based on conditions specified in the "print data deletion conditions" of the printing conditions information 72. The deletion approval/disapproval judge portion 109 judges that print data 71 and printing conditions information 72 can be deleted, as mentioned previously, after printing is completed normally based on print data 71, in a case where print data 71 that remain saved on the file server 2 for a long time are detected, in a case where time indicated in the "print data deletion time" elapsed and in other cases, for example.

When the deletion approval/disapproval judge portion 109 judges that print data 71 and printing conditions information 72 corresponding thereto can be deleted, the print data deletion portion 110 accesses the file server 2 to clear the data and the information from the print data memory portion 202.

Figure 7:
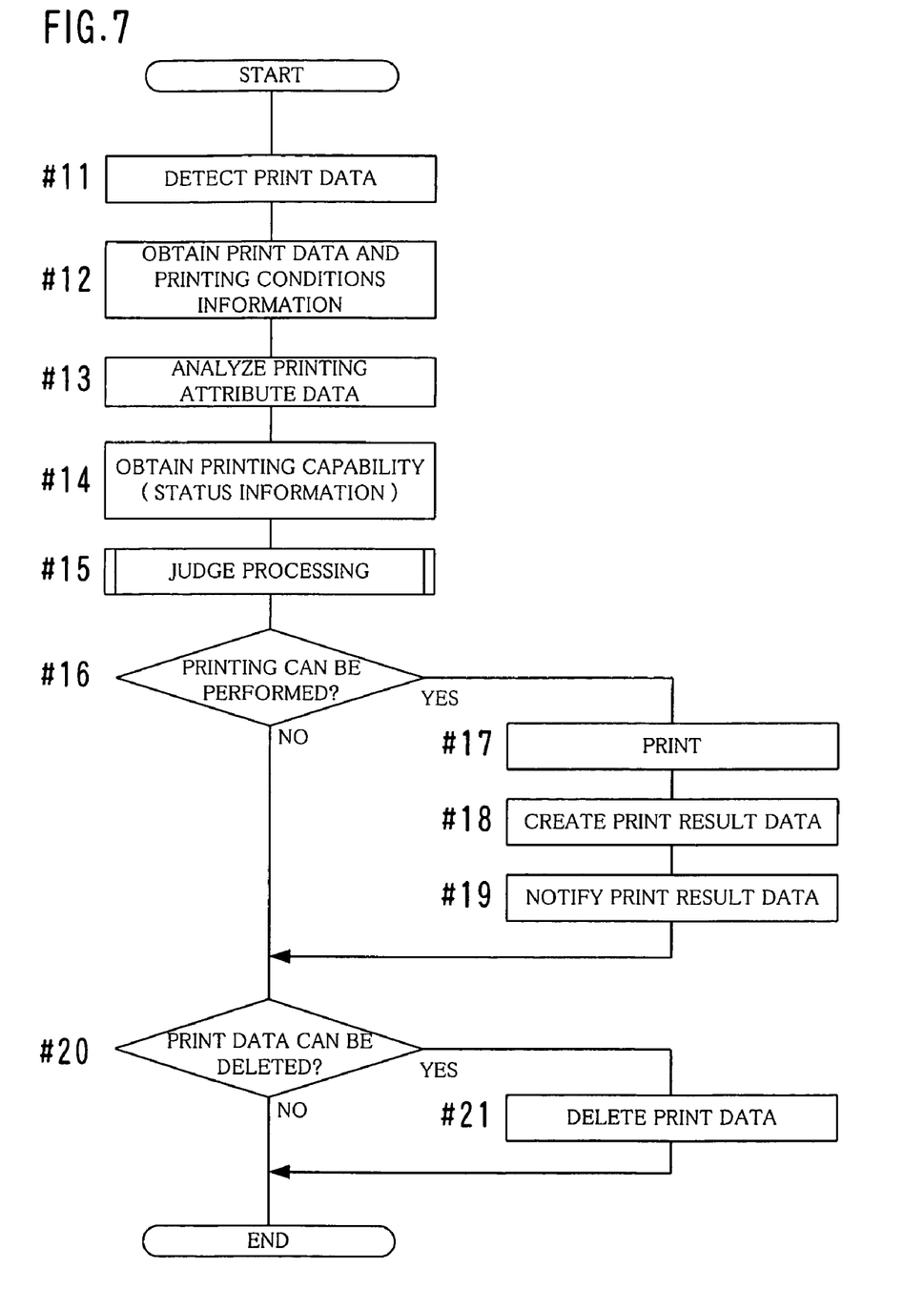
FIG. 7 is a flowchart explaining processing in the printer according to the present embodiment.

FIG. 7 is a flowchart explaining processing in a printer 1 according to the present embodiment. Next, an explanation is made to processing procedure in the case of printing a document (a material) of a user using a printer 1 with reference to the flowchart. The CPU 1a executes programs stored in a magnetic storage device, the magnetic storage device 1f, a ROM (the nonvolatile memory 1e) or others of the printer 1, so that each processing shown in FIGS. 6 and 7 is realized.

A user operates his/her terminal device 3 to set printing attribute on the printing conditions designation screen HG1 shown in FIG. 4. Then, the user sends print data 71 of a document to be printed to the file server 2 along with printing conditions information 72.

The printer 1 accesses the print data memory portion 202 (see FIG. 3) in the file server 2 at predetermined timing to check whether or not print data 71 and printing conditions information 72 corresponding thereto are stored. After checking, when print data 71 and the corresponding printing conditions information 72 are detected (#11), the printer 1 downloads and obtains the same (#12).

The printer 1 analyzes the obtained printing conditions information 72 (#13). Before or after the analysis or in parallel with the analysis, the printer 1 obtains status information 73 of its own (#14). It is determined whether or not printing may be performed using the obtained print data 71 based on the printing conditions information 72 and the status information 73 (#15). Here, the determination method is as explained above with reference to the flowchart shown in FIG. 6.

When judging that printing may be performed (Yes in #16), the printer 1 implements a printing process based on the print data 71 (#17). After that, the printer 1 generates print result data 75 for informing the user of the result (#18) to send the same to the terminal device 3 in the form of e-mail (#19).

Before or after the processing in steps #11-19 or in parallel with the same, the printer 1 checks print data 71 that should be deleted out of print data 71 saved on the file server 2 (#20). When there are print data 71 that need to be deleted, the printer 1 instructs the file server 2 to clear the print data 71 (#21). For example, the print data 71 used for the printing process in step #17 become data to be deleted.

In step #12, though both the print data 71 and the printing conditions information 72 are obtained at the same time, only the printing conditions information 72 may be obtained prior to getting the print data 71. Then, the print data 71 may be obtained when the printer 1 judges that printing may be performed (Yes in #16) as the result of step #15. Further, the print data 71 and the printing conditions information 72 are not necessarily deleted at the same time and may be deleted at different timing.

According to the present embodiment, a printer 1 can be used readily and preferably in the printing system 100 without adding special setting and structures relating to the printer 1 to the file server 2 and the terminal device 3. More particularly, burden for setting a printer 1 is not imposed on a user and a system administrator.

In the present embodiment, a printing process based on one piece of print data 71 is performed by one printer 1 of the plural printers included in the printing system 100. However, the printing system 100 may be so structured that plural printers 1 perform such a printing process. For instance, all the printers 1 satisfying predetermined conditions are made to perform printing based on one piece of the same print data 71, ensuring that broadcast transmission of a document can be realized. In this case, the download ban flag discussed above is not used and deletion of print data 71 is carried out after predetermined time elapses. For example, the deletion may be carried out after predetermined time elapses from upload of print data 71 to the file server 2, or after predetermined time elapses from detection of print data 71 by any one of the printers 1. On this occasion, each of the printers 1 memorizes a data name or others of the print data 71 in order to avoid printing repeatedly.

When print data 71 saved on the print data memory portion 202 in the file server 2 are not used by each printer 1 even after predetermined time elapses, it is possible to inform a user who possesses the print data 71 of a message indicating that printing was not performed and the cause thereof. Such notification may be performed by the printer 1 using e-mail after predetermined time elapses, the printer 1 having requested the file server 2 to delete the print data 71.

The terminal device 3 may be provided with functions of the print data memory portion 202 and the print data transmission portion 203 of the file server 2. Stated differently, the terminal device 3 may be used as a server for providing printers 1 with print data 71. In this case, the printers 1 periodically check whether or not the terminal device 3 having such functions accumulates print data 71 to perform a printing process if required.

In the present embodiment, it is judged whether or not print data 71 and printing conditions information 72 corresponding thereto are deleted, based on print data deletion conditions specified in the printing conditions information 72. However, it is possible to judge based on unique rules for deletion provided in the printers 1.

A plurality of file servers 2 may be provided in the printing system 100. In this case, each printer 1 accesses a file server 2 that is set beforehand to check the presence or absence of print data 71, then to implement a printing process if necessary. Alternatively, each of the file servers 2 sets access privileges for each printer 1 in advance, and each printer 1 attempts to access all the file servers 2. Then, each of the file servers 2 determines whether or not the printer 1 that attempted to access the file server 2 may perform a printing process, based on access privileges of the printer 1. Such a structure of the printing system is also possible.

Structures, conditions for judging print approval/disapproval, processing contents and processing order of each part or whole part of the printing system 100, the printers 1, the file server 2 and the terminal devices 3 can be varied as required within the scope of the present invention.

What is claimed is:

1. A printing system including a server and a plurality of printers,
    the server comprising:
        a print data memory portion that stores therein print data and printing conditions information indicating conditions relating to printing and used as a setting value in case of printing, and
    each of the plurality of printers comprising:
        a print portion;
        a detection portion that accesses the server to detect whether or not the server stores the print data regardless of whether the print data is designated to any printer; and
        a print data request portion that makes a request to the server for the print data when the print data is detected,
    wherein the server further comprises
        a print data transmission portion that transmits the print data and the printing conditions information stored in the print data memory portion to a printer, among the plurality of printers, which makes the request for the print data,
    wherein said each of the plurality of printers further comprises:
        a print data receiving portion that receives the print data and the printing conditions information;
        a print approval/disapproval judge portion to make a comparison, at the printer that has received the print data, the received printing conditions information and status information indicating at least specifications of the printer that has received the print data, and to judge whether or not printing can be performed based on a result of the comparison; and
        a print control portion that controls the print portion so that the printing is performed when the print approval/disapproval judge portion determines that the printing can be performed, and controls the print portion so that the printing is not performed when the print approval/disapproval judge portion determines that the printing can not be performed, and
    wherein, after the print data transmission portion transmits the print data stored in the print data memory portion to any one of the plurality of printers, the print data transmission portion does not transmit the print data to other of the plurality of printers even if the other of the plurality of printers makes a request for the print data, and, thereafter, when said one of the plurality of printers determines that the printing can not be performed and transmits a signal to the server indicating that printing can not be performed, the print data transmission portion begins transmitting the print data upon request from said other of the plurality of printers.

2. The printing system according to claim 1, wherein the print data receiving portion receives the print data detected by the detection portion after the print approval/disapproval judge portion determines that printing can be performed.

3. The printing system according to claim 1, wherein said each of the plurality of printers further comprises a print data deletion portion that issues a command to delete the print data to the server when the printing is performed based on the print data.

4. The printing system according to claim 1, wherein said each of the plurality of printers further comprises a result notification portion that informs of a result of the printing,
    wherein the printing conditions information includes information specifying a creator of the print data, and the result notification portion informs the creator specified in the printing conditions information of a result of the printing when the printing is performed.

5. A printing system including a server and a plurality of printers, the server comprising:
a print data memory portion that stores therein print data and printing conditions information indicating conditions relating to printing and used as a setting value in case of printing, and each of the plurality of printers comprising:
a detection portion that accesses the server to detect whether or not the server stores the print data regardless of whether the print data is designated to any printer; and
a print data request portion that makes a request to the server for the print data when the print data are detected;

wherein the server further comprises
a print data transmission portion that transmits the print data and the printing conditions information stored in the print data memory portion to a printer, among the plurality of printers, which makes the request for the print data, wherein said each of the plurality of printers further comprises:
a print portion;
a print data receiving portion that received the print data and the printing conditions information;
a suitability judge portion that makes a comparison, at the printer that has received the print data, the received printing conditions information and status information indicating at least specifications of the printer that has received the print data, and judges a suitability of the printing based on the result of the comparison;
a transmission portion that transmits the suitability to the server;
a print approval/disapproval judge portion that, if said each of the plurality of printers is a printer that has received the print data and the printing conditions information, and when a predetermined period elapses after the suitability of the printing is transmitted by the transmission portion, judges that the printing can be performed if the suitability of said each of the plurality of printers is judged to be higher than the suitability of the plurality of printers other than said each of the plurality of printers, and the printing can not be performed if the suitability of said each of the plurality of printers is judged to be lower than the suitability of the plurality of printers other than said each of the plurality of printers; and
a print control portion that controls the print portion so that the printing is performed when the print approval/disapproval judge portion determines that printing can be performed, and controls the print portion so that the printing is not performed when the print approval/disapproval judge portion determines that the printing can not be performed, and wherein, after the print data transmission portion transmits the print data and the printing conditions information stored in the print data memory portion to any one of the plurality of printers, the print data transmission portion does not transmit the print data to other of the plurality of printers even if the other of the plurality of printers makes a request for the print data, and, thereafter, when said one of the plurality of printers determines that the printing can not be performed and transmits a signal to the server indicating that printing can not be performed, the print data transmission portion begins transmitting the print data upon request from said other of the plurality of printers.

6. The printing system according to claim 5, wherein the transmission portion transmits the suitability with the printing conditions information to replace another suitability and another piece of the printing conditions information that were previously stored in the server.

7. A method for printing in a printing system comprising a server that includes a print data memory portion and a plurality of printers that include print portions individually, the method comprising:
storing, in the print data memory portion, print data regardless of whether the print data is designated to any printer, printing conditions information indicating conditions relating to printing and used as a setting value in case of printing, and a flag indicating whether download is prohibited or not;
causing the plurality of printers to individually detect the print data in the print data memory portion;
causing a printer that among the plurality of printers which has actually detected the print data to make a request to the server for the print data;
causing the server, if the flag does not indicate that download is prohibited, to transmit the print data and the printing conditions information stored in the print data memory portion to the printer that has made the request for the print data;
causing the printer to which the print data and the printing conditions information are transmitted from the server to receive the print data and the printing conditions information;
causing the printer that has received the print data and the printing conditions information to determine whether or not printing can be performed based on the print data and in accordance with the printing conditions information;
causing the printer that has determined whether or not printing can be performed to control the print portion so that the printing is performed if it is determined that the printing can be performed, and to control the print portion so that the printing is not performed if it is determined that the printing can not be performed;
causing the server, if the print data has been transmitted to any of the plurality of printers, to perform a process of updating the flag so that the flag indicates that the download is prohibited; and
causing the server, if any of the plurality of printers determines that the printing can not be performed, to perform a process of updating the flag so that the flag indicates that the download is not prohibited, wherein, after the print data and the printing conditions information stored in the print data memory portion are transmitted to any one of the plurality of printers, the print data and the printing conditions information are not transmitted to another of the plurality of printers even if the other of the plurality of printers makes a request for the print data, and, thereafter, when said one of the plurality of printers determines that the printing can not be performed and transmits a signal to the server indicating that printing can not be performed, the server begins transmitting the print data and the printing conditions information upon request from said other of the plurality of printers.

8. A method for printing in a printing system comprising a server that includes a print data memory portion that stores therein print data and printing conditions information indicating conditions relating to printing and used as a setting value in case of printing, and a plurality of printers that include print portions individually, the method comprising:

a first step of accessing, individually by the plurality of printers, the server to detect whether or not the server stores the print data regardless of whether the print data is designated to any printer;

a second step of making a request, by a printer among the plurality of printers which has detected the print data, to the server for the print data;

a third step of transmitting, by the server, the print data and the printing conditions information stored in the print data memory portion to the printer that has made the request;

a fourth step of receiving, by the printer to which the print data and the printing conditions information are transmitted, the print data and the printing conditions information;

a fifth step of making a comparison, by the printer that has received the print data and the printing conditions information, the printing conditions information and status information indicating at least specifications of the printer itself that has received the print data and the printing conditions information, and judging, by the printer that has received the print data and the printing conditions information, suitability of the printing based on a result of the comparison;

a sixth step of transmitting, by the printer that has judged the suitability, the suitability to the server;

a seventh step of judging, by the printer that has transmitted the suitability to the server, that the printing can be performed when the suitability of the printer that has transmitted the suitability to the server is judged to be higher than that of the plurality of printers other than the printer that has transmitted the suitability to the server, and that the printing can not be performed when the suitability of said the printer that has transmitted the suitability to the server is judged to be lower than that of the plurality of printers other than the printer that has transmitted the suitability to the server; and an eighth step of controlling, by the printer that has judged the suitability, the print portion thereof so that printing is performed when it is determined that the printing can be performed, and controlling, by the printer that has judged the suitability, the print portion thereof so that the printing is not performed when it is determined that the printing can not be performed, wherein, after the print data and the printing conditions information stored in the print data memory portion are transmitted to any one of the plurality of printers, the print data and the printing conditions information are not transmitted to another of the plurality of printers even if the other of the plurality of printers makes a request for the print data, and, thereafter, when said one of the plurality of printers determines that the printing can not be performed and transmits a signal to the server indicating that printing can not be performed, the server begins transmitting the print data and the printing conditions information upon request from said other of the plurality of printers.

9. A method according to claim 8, wherein in the sixth step, the printer that has judged the suitability transmits the suitability with the printing conditions information to replace another suitability and another piece of the printing conditions information that were previously stored in the server.

10. The printing system according to claim 1, wherein the detection portion periodically accesses the server to detect whether or not the server stores the print data.

11. The printing system according to claim 5, wherein the detection portion periodically accesses the server to detect whether or not the server stores the print data.

12. A method according to claim 7, wherein when the plurality of printers individually detect the print data in the print data memory portion, the plurality of printers individually access the server periodically.

13. A method according to claim 8, wherein, in the first step, the plurality of printers individually access the server periodically.

* * * * *